June 29, 1926.
T. H. WILLIAMS
SHOCK ABSORBER
Original Filed April 11, 1923
1,590,561
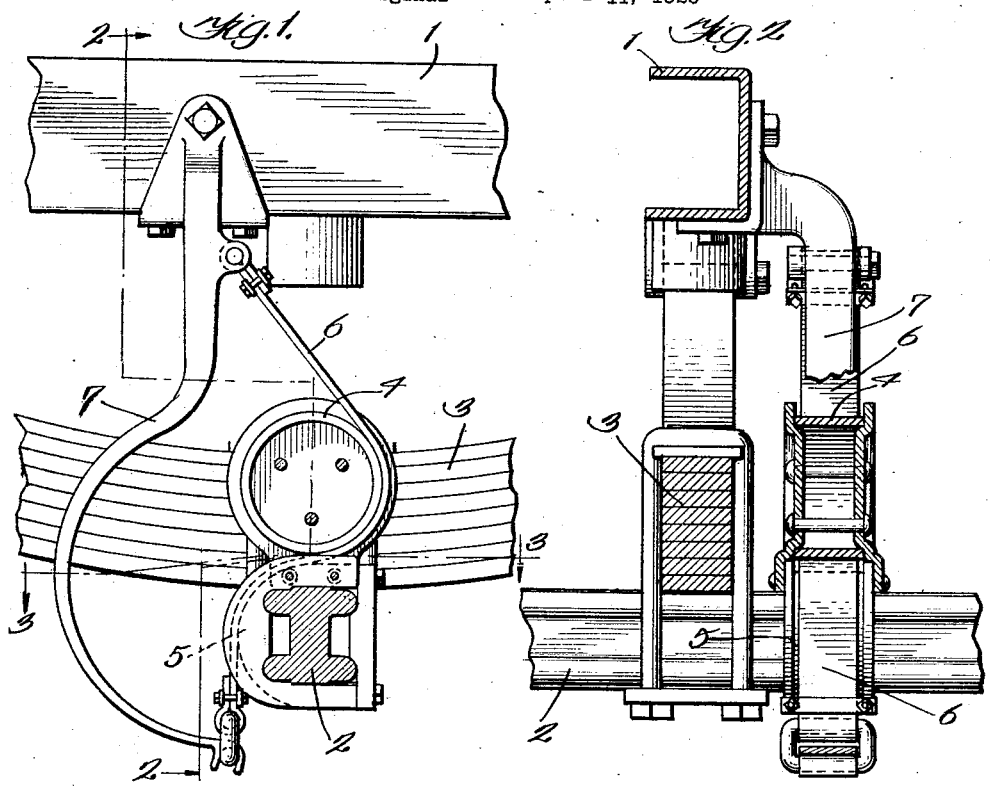
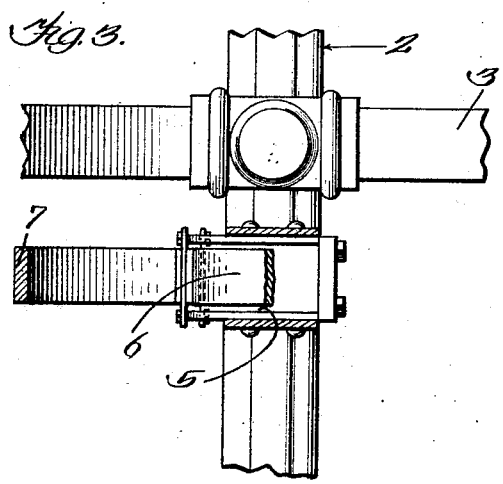
Inventor:
Theron H. Williams
By G. L. Gragg
Atty.

Patented June 29, 1926.

1,590,561

UNITED STATES PATENT OFFICE.

THERON H. WILLIAMS, OF CHICAGO, ILLINOIS.

SHOCK ABSORBER.

Application filed April 11, 1923, Serial No. 631,340. Renewed December 2, 1925.

My invention relates to vehicles employing vehicle bodies and running gears together with vehicle body supporting springs between these vehicle elements.

It is the object of my invention to provide an improved form of shock absorber between the body and running gear of such a vehicle. In my co-pending application Serial No. 631338, filed April 11, 1923, I have disclosed an improved shock absorber comprising a friction body upon the vehicle body, a looped flexible strip whose bight receives and frictionally engages said friction body, an arm mounted to turn upon the running gear and connected with one end of said flexible strip whose other end is connected with the running gear, and arm actuating means between the vehicle elements and between said arm and vehicle body.

In carrying out my present invention I provide the friction body upon one of the vehicle elements, an arm mounted at one end upon the other vehicle element and having one end of the flexible strip connected with its unmounted end, the other end of the flexible strip being connected with the vehicle element upon which the arm is mounted. The flexible strip is desirably formed with a bight that receives the friction body.

In the preferred embodiment of the invention there are two friction bodies upon the same vehicle element located upon opposite sides of the flexible strip, these friction bodies defining a sinuous path of movement of the flexible strip as the relative movement occurs between the vehicle body and running gear.

I will explain my invention more fully by reference to the accompanying drawing in which Fig. 1 is a side view, partially in section, of a portion of a vehicle structure having the preferred embodiment of my invention applied thereto; and Figs. 2 and 3 are sectional views taken, respectively, on lines 2—2 and 3—3 of Fig. 1.

Like parts are indicated by similar characters of reference throughout the different figures.

The vehicle illustrated is an automobile, though the invention is not to be thus restricted. A portion 1 of the body of the vehicle is illustrated as is also a portion 2 of the running gear. This running gear may be inclusive of vehicle wheels, not shown. The vehicle body is supported upon the running gear by means of supporting springs, one of these springs being illustrated at 3. The illustrated shock absorber includes a circular friction body 4, the friction element 5 on the axle 2, a friction flexible strip 6 attached at one end to the vehicle body and at its other end to the unmounted end of an arm 7 that is mounted at its other end upon the vehicle body 1. The friction producing elements 4 and 5 are desirably located one above the other and serve to define a sinuous course for the flexible strip as it moves therebetween. The upper portion of the flexible strip desirably slopes over the friction body 4 toward the arm 7 so that the friction is increased as the vehicle body approaches the running gear. While both bodies 4 and 5 are desirably rigid so that each may produce friction, the invention is not to be thus limited.

The arm 7 is desirably of spring formation at its lower or unmounted end so that it may yield if undue strain would otherwise be placed upon the flexible strip, the arm being sufficiently strong to produce the required friction in normal operation. When the vehicle body descends, the lower end of the arm pulls downwardly upon the strip 6 and when the vehicle body rises, it pulls upwardly upon the strip. The arm itself constitutes the means through which the vehicle body exerts pull upon the strip as the vehicle body and vehicle running gear approach.

There are desirably four such shock absorbers, one at each of the four vehicle wheels, but the invention is not to be thus restricted.

The term flexible strip is used in the broad sense of any suitable flexible friction producing member arranged as herein shown and claimed.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

The combination with a vehicle body; of a vehicle running gear carrying said vehicle body; and a shock absorber including a friction body carried by one of the vehicle elements, an arm carried by the other vehicle element, and a flexible strip in frictional engagement with said friction body and connected at its ends with the ends of said arm, the arm and the vehicle element carrying it cooperating to pull upon said strip as the vehicle body moves toward and from the running gear, said arm constituting means through which pulling action is exerted upon the strip as the vehicle elements approach, a portion of the unmounted end of the arm that is connected with the strip being of spring formation.

In witness whereof, I hereunto subscribe my name this 2nd day of April A. D., 1923

THERON H. WILLIAMS.